June 27, 1933.  P. D. WRIGHT  1,915,710
SHUFFLE FEEDER
Filed April 9, 1932   2 Sheets-Sheet 1
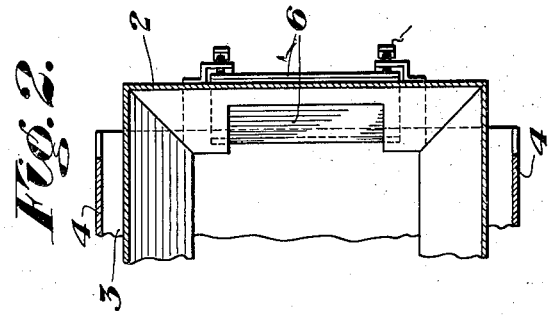
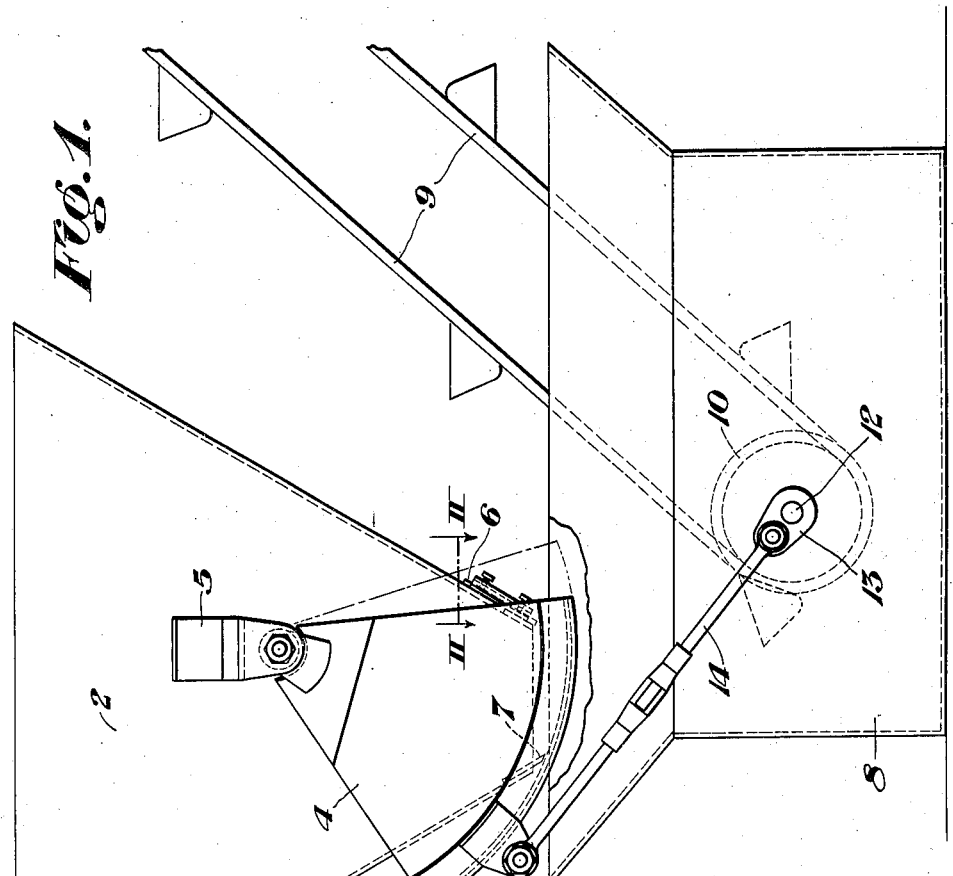
Inventor
Paul D. Wright, dec'd
by Olive Pauline Wright, Ex'trix
by Usina & Rauber
his Attorneys

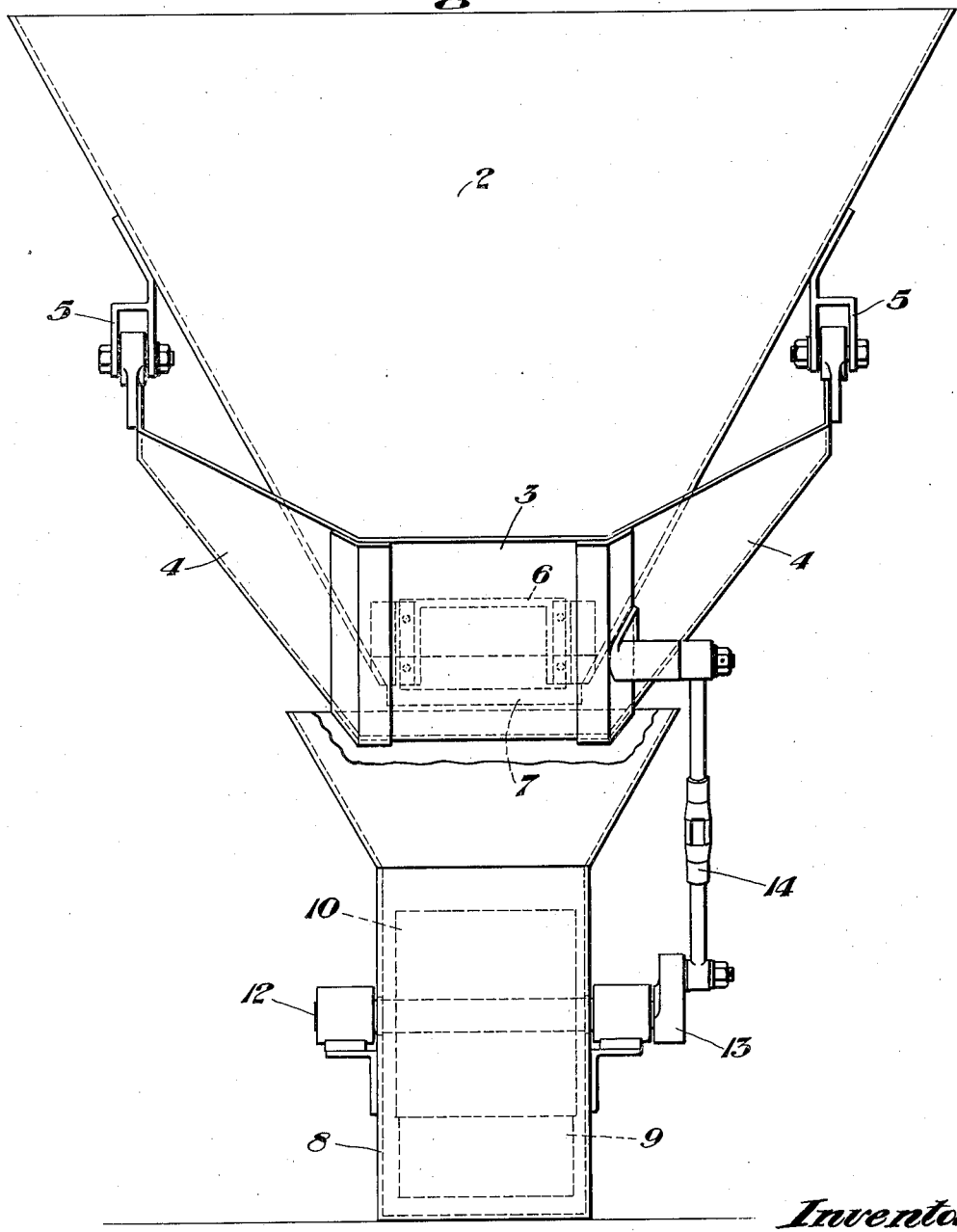

Patented June 27, 1933

1,915,710

UNITED STATES PATENT OFFICE

PAUL D. WRIGHT, DECEASED, LATE OF EDGEWOOD, PENNSYLVANIA, BY OLIVE PAULIN WRIGHT, EXECUTRIX, OF EDGEWOOD, PENNSYLVANIA

SHUFFLE FEEDER

Application filed April 9, 1932. Serial No. 604,283.

This invention relates to bin gates, and while not limited thereto relates more specifically to a shuffle feeder gate for controlling the feed of coke and other similar material from storage bins and the like, and has for its object the provision of an improved structure of this class which will be simple in operation and will provide a constantly measured feed of the material from the bin.

In the drawings:

Figure 1 is a side elevation of a bin and shuffle feeding mechanism constructed in accordance with this invention.

Figure 2 is a fragmentary sectional plan taken on the line II—II of Figure 1.

Figure 3 is a rear end elevation of the apparatus of Figure 1.

Referring more particularly to the drawings, the numeral 2 designates the lower portion of a material storage bin, the side walls of which are inclined downwardly and inwardly and the lower end of which is open to permit the discharge of the material from the bin. An arcuate shaped gate member 3, having side members 4, is provided for normally closing the discharge opening at the lower end of the bin 2. The side members 4 of the gate 2 extend upwardly along opposite sides of the bin 2, and are pivotally connected to supporting members 5 secured to the bin at one side of the center line of said bin. The forward side wall of said bin, that is, the side wall next the point of connection of said gate, has its lower portion cut away to form additional discharge space for the material passing onto said gate, and said cut away portion is adapted to be closed by an adjustable plate member 6 which is adapted to be regulated toward and away from the gate member 3 to regulate the flow of material onto the gate. The rear side wall of the bin 2 is provided with a wear plate 7 which projects downwardly closely adjacent the gate 3.

An elevator boot 8 is positioned below the lower end of the bin 2 and is adapted to have the lower end of an endless bucket conveyer 9 positioned therein. The conveyer 9 is trained over tail pulley 10 within the boot 8, which pulley is mounted on a shaft 12.

In order to rock or shift the gate 3 about its pivotal connection with the brackets 5, a crank arm 13 is secured to the tail shaft 12 of the conveyer 9, and this crank arm 13 is connected to the gate 2 by a connecting-rod 14.

In operation, when the elevator 9 is set in motion the crank arm 13 will be rotated and motion will be imparted to the gate 3 through the connecting-rod 14 so as to shift or rock the gate 3 about its pivotal mountings and cause the material deposited on the gate from the bin to flow out by lateral displacement.

As the material is forced over the edge of the gate 3 it will be deposited in the oncoming bucket of the conveyer 9. A certain amount of spillage will take place and the material spilled is allowed to accumulate in the elevator boot 8 until there is a sufficient quantity of material collected in the chute for the oncoming buckets to pick up as they pass around the tail pulley 10.

Due to the particular mounting of the gate 3 at a point forward of the center line of the bin 2, it is unnecessary to uncover the open lower end of the bin in order to permit a measured discharge of the material from the bin. Therefore, this gate may be readily operated to discharge measured quantities of the material without any danger of pieces of the material becoming lodged between the gate and the lower end of the bin as would be the case if the gate were mounted on the center line so as to make it necessary to move the material over the lower edge of the bin in order to get a discharge of material from the bin.

While one specific embodiment of this invention has been shown and described, it will be understood that the invention is not to be limited thereto, since various modifications may be made without departing from the scope of the invention, as defined in the appended claims.

What is claimed is:

1. The combination with a bin having downwardly and inwardly sloping side walls and an open lower end of an endless bucket type conveyer adapted to receive the material discharged from said bin and having its tail shaft adjacent and below the lower end of said bin, an arcuate shaped gate member for controlling the flow of material through said open lower end of said bin, said gate having side portions extending upwardly along said bin and pivotally connected to said bin at one side of the center line of said bin, the side wall of said bin nearest said point of connection of said gate having its lower end cut away, an adjustable plate mounted over said cut away portion and adapted to regulate the flow of material through said gate, a wear plate for the other side wall of said bin, a crank arm secured to the tail shaft of said conveyer and a connecting-rod connecting said crank arm and said gate whereby said gate will be rocked to cause a lateral displacement of a regulated quantity of material from said gate onto said conveyer.

2. In combination with a conveyer, a bin having downwardly and inwardly sloping side walls, an arcuate shaped gate member for controlling the flow of material through the lower end of said bin, said gate having side portions extending upwardly along said bin and pivotally connected to said bin at one side of the center line of said bin, the side wall of said bin nearest said point of connection of said gate having its lower end cut away, an adjustable plate mounted over said cut away portion and adapted to regulate the flow of material onto said gate, a wear plate for the other side wall of said bin, a rotating shaft associated with said conveyer, a crank arm secured to said shaft and a connecting-rod connecting said crank arm and said gate.

In testimony whereof, I have hereunto set my hand.

OLIVE PAULIN WRIGHT,
*Executrix of the Estate of Paul D. Wright, Deceased.*